United States Patent [19]
Malone

[11] Patent Number: 5,232,586
[45] Date of Patent: Aug. 3, 1993

[54] FLOATING MEDIA HOURGLASS BIOFILTER

[76] Inventor: Ronald F. Malone, 2017 General Lee Ave., Baton Rouge, La. 70810

[21] Appl. No.: 951,459

[22] Filed: Sep. 25, 1992

[51] Int. Cl.$^5$ .................................................. C02F 3/06
[52] U.S. Cl. ................................ 210/151; 210/221.2; 210/616; 210/618; 210/150
[58] Field of Search ................. 210/150, 151, 221.2, 210/616, 618, 617, 219

[56] References Cited

U.S. PATENT DOCUMENTS

| | | | |
|---|---|---|---|
| 887,069 | 5/1908 | Cotter | 210/306 |
| 3,956,128 | 5/1976 | Turner | 210/150 |
| 4,036,854 | 7/1977 | Chang | 260/343.2 |
| 4,052,300 | 10/1977 | Mosso | 210/20 |
| 4,198,301 | 4/1980 | Iwatani | 210/274 |
| 4,432,721 | 2/1984 | Evans et al. | 261/123 |
| 4,547,286 | 10/1985 | Hsiung | 210/738 |
| 4,608,181 | 8/1986 | Hsiung et al. | 210/786 |
| 4,743,382 | 5/1988 | Williamson et al. | 210/786 |
| 4,865,734 | 9/1989 | Schulz | 210/279 |
| 5,030,353 | 7/1991 | Stuth | 210/618 |
| 5,126,042 | 6/1992 | Malone | 210/150 |

FOREIGN PATENT DOCUMENTS

| | | |
|---|---|---|
| 903800 | 8/1962 | Fed. Rep. of Germany . |
| 120867 | 11/1918 | United Kingdom ................. 210/274 |

*Primary Examiner*—Stanley S. Silverman
*Assistant Examiner*—Cynthia L. Nessler
*Attorney, Agent, or Firm*—Robert C. Tucker; William D. Kiesel; C. Dean Domingue

[57] ABSTRACT

A floating media filter is provided, comprising a tank having a filtration chamber and an expansion chamber, wherein the filtration chamber is above and fluidically connected with the expansion chamber; floating filter media in the tank for forming a floating media pack, having a top portion, in the filtration chamber when the tank is filled with liquid and the filter media are undisturbed; an upper screen having openings adapted to prevent the filter media from passing therethrough, positioned in the tank near the top portion of the floating media pack; an inlet line fluidically connected to the tank below the filtration chamber; a sludge line having an output end, fluidically connected to the tank below the lower screen; a sludge valve, positioned in the sludge line; an outlet line fluidically connected to the tank above the upper screen; a lower screen having openings adapted to prevent the filter media from passing therethrough, positioned in the tank below the filter media and above the sludge line; and an air inlet line fluidically connected to the tank for drawing air into the expansion chamber and disturbing the floating media pack inside the filtration chamber during backwashing of the biofilter.

20 Claims, 7 Drawing Sheets

FLOATING MEDIA HOURGLASS BIOFILTER

BACKGROUND OF THE INVENTION

I. Field of the Invention

This invention relates generally to wastewater treatment systems which biologically treat wastewater and, more particularly, to biological treatment systems which use floating filter media to biologically treat wastewater.

II. Description of Prior Art

In high density aquaculture systems used for the production of aquatic animals such as catfish, tilapia, alligators, and clams, and in other water systems which generate wastewater, it is necessary to remove suspended solids, optimize nitrification and to reduce biochemical oxygen demand (BOD) of the wastewater. In all cases, treated water is eventually returned to the ecosystem, whether the return is to a lake or stream or back to a controlled aquaculture system. Varying load and flow conditions make operation of waste treatment systems difficult, in that the timing of treatment steps is dependent upon such changing conditions.

In the operation of any wastewater treatment system, it is desirable to waste as little water as possible and to maximize the concentration of waste sludge accumulated by the system. This is especially true in high density aquaculture systems, where constant recirculation of water is necessary, and where it is desirable to minimize the amount of water wasted in the treatment process. Water loss also becomes critically important when the waste water volume approaches the volume of the aquaculture system being treated, such as in aquaria used in pet stores and research labs. The principal problems with high water loss in any aquaculture system are: 1) the costs of treating high volumes of the backwashed waters, 2) in warm water aquaculture systems, heat losses due to release of the backwash water, 3) increased water demands and pretreatment costs, and 4) high capital costs for pumps and other equipment whose size is dictated by peak water demands.

Most prior art systems accomplish treatment using various traditional treatment components, such as aeration basins, filters and clarifier units, with each component having its own treatment and energy consumption limitations. A system which efficiently combines the features of separate component systems would have greater advantages over those presently in use.

The only known filter which overcomes most of these problems is the biofilter disclosed in U.S. Pat. No. 5,126,042 issued to the Applicant herein, Dr. Ronald F. Malone. That device uses a tank having sidewalls which are inwardly sloping toward the bottom, wherein a floating media pack is caused to form near the top of the tank when it is filled with liquid during filtration. A propeller-type agitator is employed to fluidize the media pack and break up the filtered matter prior to backwashing the system, and a drain line is opened near the bottom of the tank to allow accumulated sludge to leave the tank.

While the prior art device is relatively easy to use and effective in meeting the demands of most aquaculture filtering environments, it is also subject to breakdown and maintenance problems inherent in any system which relies on rotating mechanical elements. It would be desirable, therefore, to have a biofilter which eliminates the need for a motorized backwashing system, and which still satisfies the goals of removing suspended solids, minimizing water loss during backwashing, reducing biochemical oxygen demand (BOD), and providing nitrification for the aquaculture subject to filtration.

SUMMARY OF THE INVENTION

Therefore, it is an object of this invention to provide a floating media hourglass biofilter which allows treatment of a wastewater stream in a single treatment device.

It is another object of this invention to provide a floating media hourglass biofilter which has a higher carrying capacity (volume of waste processed per cubic foot) than comparable wastewater treatment systems, reducing associated captial costs.

It is still another object of this invention to provide a floating media hourglass biofilter which facilitates automated optimization of biofiltration processes (BOD reduction and nitrification).

It is a further object of this invention to provide a floating media hourglass biofilter which is particularly adaptable to recirculating waste streams, such as those in high density aquaculture operations.

It is yet another object of this invention to provide a floating media hourglass biofilter which reduces aeration, degasification, chemical addition, and water demand of recirculating waste systems by reducing waste impact through rapid biofloc harvesting and solids removal.

Yet another object of this invention is to provide a floating media hourglass biofilter which is easy to use and maintain, and which has a minimum of moving parts.

It is another object of this invention to provide a floating media hourglass biofilter which accomplishes various combinations of the above objects.

These and other objects and advantages of the present invention will no doubt become apparent to those skilled in the art after having read the following description of the embodiments which are contained in and illustrated by the various drawing figures.

Accordingly, a biofilter is provided, comprising a tank having a filtration chamber and an expansion chamber, wherein the filtration chamber is above and fluidically connected with the expansion chamber; floating filter media in the tank for forming a floating media pack, having a top portion, in the filtration chamber when the tank is filled with liquid and the filter media are undisturbed; an upper screen having openings adapted to prevent the filter media from passing therethrough, positioned in the tank near the top portion of the floating media pack; an inlet line fluidically connected to the tank below the filtration chamber; a sludge line having an output end, fluidically connected to the tank below the the lower screen; a sludge valve, positioned in the sludge line; an outlet line fluidically connected to the tank above the upper screen; a lower screen having openings adapted to prevent the filter media from passing therethrough, positioned in the tank below the filter media and above the sludge line; and an air inlet line fluidically connected to the tank for drawing air into the expansion chamber and disturbing the floating media pack inside the filtration chamber during backwashing of the biofilter.

DETAILED DESCRIPTION OF THE PREFERRED EMBODIMENT

In the drawings many details pertaining to fabrication and maintenance utility well-established in the machine construction art and not bearing upon points of novelty are omitted in the interest of descriptive clarity and efficiency.

Figure 1:
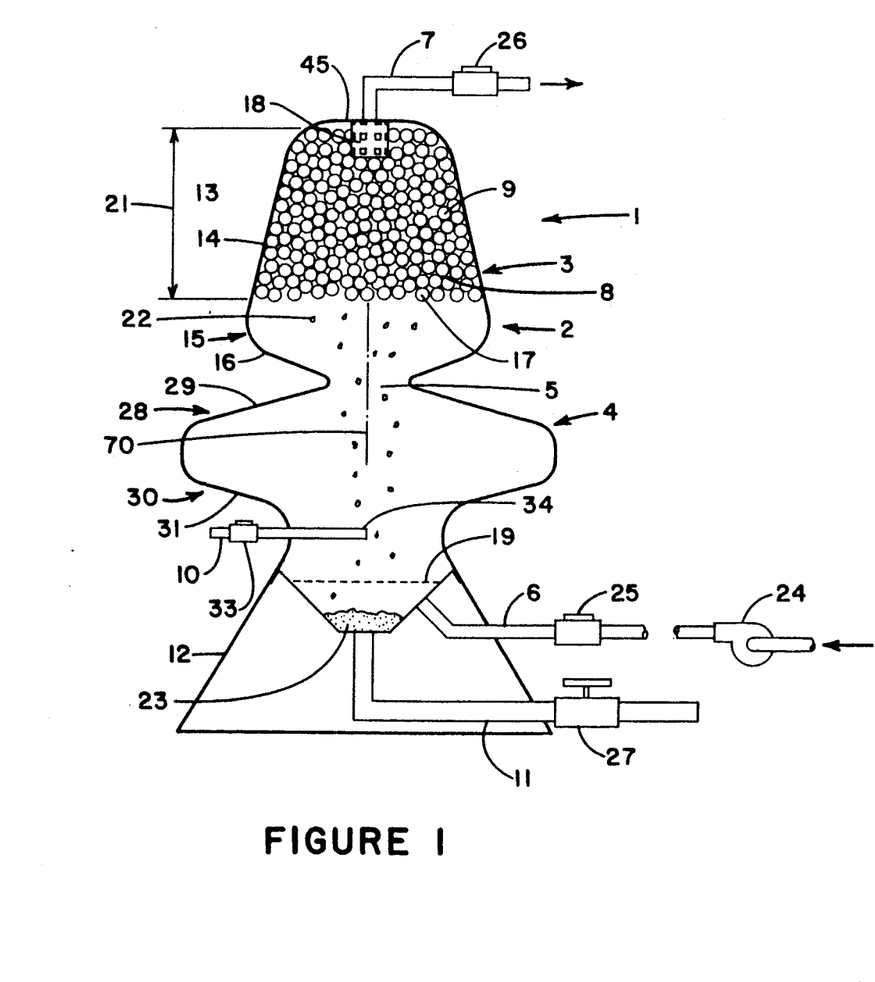
FIG. 1 is a sectional view of an embodiment of the invention during the filtration step of operation.

Turning now to FIG. 1, a floating media biofilter 1 is shown in a preferred embodiment during the filtration step of operation. The biofilter 1 generally comprises tank 2, which has a filter chamber 3 and an expansion chamber 4 divided by a washing throat 5, or a constricting means, which has a central axis 70. Inlet line 6 is fluidically connected to tank 2 and provides a source of water or other fluid to be filtered, and is delivered to tank 2 by any means capable of lifting the water to the top of tank 2, such as a pump 24. Filtered water exits tank 2 by way of outlet line 7, and is returned to the source. Floating media 8 is present in filtration chamber 3 and forms a floating media pack 9 during filtration. Air inlet line 10 is fluidically connected to the base of expansion chamber 4 and draws a stream of air from the atmosphere or from a pressurized air source into expansion chamber 4 during the backwashing step. At the base of expansion chamber 4, sludge line 11 is fluidically connected and allows for emptying of accumulated sediment and waste water.

Tank 2 is preferably constructed from any suitable material such as plastic, fiberglass, or steel, and may be supported by any convenient means, such as support base 12. Because media pack 9 can develop over time into a semi-gelatinous mass, it is desirable that filtration chamber 3 be round in cross-section when viewed from the top 45 of biofilter 1, and that its upper portion 13 include downwardly diverging sidewalls 14 so that media pack 9 may easily slide away from sidewalls 14 during the backwashing operation. The extent of divergence of sidewalls 14 is not critical, but should exceed about 5° from vertical to ensure displacement of the media pack 9. Upper portion 13 should have sufficient volume to contain all of the filter media 8 once they have formed the media pack 9. Likewise, lower portion 15 of filtration chamber 3 should comprise downwardly converging sidewalls 16 that lead into washing throat 5. A preferred angle for sidewalls 16 is about 45° from vertical, which tends to ensure that all pellets 17 in the media pack 9 are allowed to pass through washing throat 5, while minimizing undesirable perching of the media pack 9 at the end of the wash cycle.

As with the upper portion 13 of filtration chamber 3, expansion chamber 4 should have a volume which is sufficient to hold all the filter media 8 once they have passed through washing throat 5. It is desirable that expansion chamber 4 be round in cross-section when viewed from the top 45 of biofilter 1, and that its upper portion 28 include downwardly diverging sidewalls 29. The extent of divergence is dictated by two primary considerations: 1) the need to allow pellets 17 which have been cleansed after backwashing to rise back into the filtration chamber 3 rather than remaining in expansion chamber 4, and 2) the need to rapidly move pellets 17 passing through washing throat 5 away from the area of greatest turbulence during the backwashing step. Angles of greater than about 70° from vertical tend to reduce filtration efficiency, because of the many pellets 17 which remain in the expansion chamber 4. On the other hand, angles of less than about 30° from vertical do not allow lateral movement of the pellets 17 away from the area of greatest turbulence below the washing throat 5. Likewise, lower portion 30 of expansion chamber 4 comprises downwardly converging sidewalls 31 that allow sludge 23 to collect in a concentrated area for removal through sludge line 11.

Figure 2:
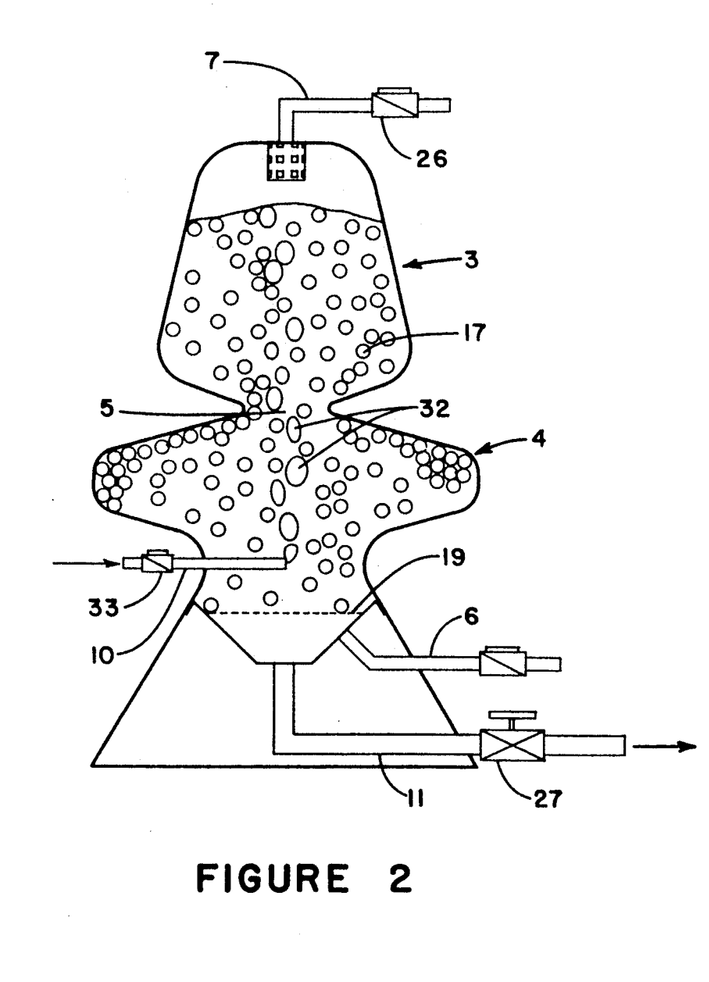
FIG. 2 is a sectional view of an embodiment of the invention during the backwashing step of operation.

As can be seen in FIG. 2, washing throat 5 is sized to assure that: 1) all media pellets 17 are exposed to turbulent washing action of the rising bubbles 32, 2) the water flowing through washing throat 5 obtains the desired flux rate during the backwashing cycle, and 3) any clumping of pellets 17 will not obstruct washing throat 5. Experience with prototypes has shown that a desirable diameter size for washing throat 5 is roughly one-fourth (¼) the largest diameter of filtration chamber 3 on large-scale biofilters 1, and roughly one-half (½) the largest diameter of filtration chamber 3 on smaller biofilters 1. It should be understood that although round cross-sections and diameters are referred to in the description of this embodiment, many other less preferable shapes may be used to achieve substantially the same result.

Floating media 8 preferably comprise multiple low density granular media pellets 17. Pellets 17 may be of any suitable material, but plastic is preferred. Low density polyethylene feed stock pellets one-eighth inch in diameter have been found to be suitable in experimental units. Enhanced biofiltration can be achieved by shaping the pellets 17 into tubular or fluted shapes (not shown) which influence the retention of solids produced by biological treatment (biofloc). Floating media 8 form a media pack 9 when tank 2 is filled with water or other liquid, and when media 8 are undisturbed. Upper screen 18 is positioned in tank 2 above media 8 where tank 2 is fluidically connected to outlet line 7, and lower screen 19 is positioned in tank 2 below expansion chamber 4 above inlet line 6. Both upper and lower screens 18,19 are constructed of either a plastic or stainless steel mesh, and are adapted to prevent pellets 17 from passing therethrough, having a mesh which is smaller than pellets 17. Sufficient media 8 should be provided so as to form a media pack 9 which provides coverage of upper screen 18 and which has a depth 21 sufficient to provide adequate suspended solids filtration of the particular waste being treated as well as to provide adequate media surface area for biological treatment of the waste flowing through the media pack 9. During treatment, biological growth forms a film on each pellet 17 which in turn provides nitrification and BOD reduction. Suspended solids removed by media pack 9, as well as biofloc, form a floc 22, some of which falls from media pack 9 and settles into expansion chamber 4 of tank 2, forming sludge 23. Over time during the filtration step, the floc 22 on media pack 9 will tend to bridge from pellet 17 to pellet 17, requiring periodic agitation of the media pack 9 ("fluidization") to loosen solids for removal. Such fluidization is achieved during the backwashing step of operation.

Inlet line 6 is fluidically connected to a pump 24 and to tank 2 at a point below lower screen 19, and preferably includes a check valve 25 which only allows flow into tank 2. Outlet line 7 fluidically connects to filtration chamber 3 above upper screen 18, and conducts treated and clarified liquid back to the ecosystem or aquaculture system, depending upon the application. Outlet line 7 preferably includes check valve 26 which only allows flow out of tank 2. Sludge line 11, having sludge valve 27, fluidically connects to tank 2 below lower screen 19 and expansion chamber 4, and is used to intermittently discharge accumulated sludge 23 from the biofilter 1. Air inlet line 10 is also fluidically connected to expansion chamber 4, and includes check valve 33 which prevents water from exiting tank 2 through air inlet line 10 during filtration.

Inlet line 6 and outlet line 7 are sized to accommodate flowrates appropriate for the particular application. For example, in aquaculture applications flowrates of about 5-15 gallons per minute (gpm) per cubic foot ($ft^3$) of media pellets 17 are generally used assuring that oxygen and ammonia transport rates are matched with the ammonia and biochemical oxygen demand (BOD) loadings. In high substrate regimes associated with wastewater treatment, flowrates are increased into a range of about 20-40 gpm/$ft^3$ to avoid oxygen depletion. Both inlet and outlet lines 6,7 may be constructed of any suitable material, such as commercially available polyvinylchloride (PVC) pipe.

Figure 3:
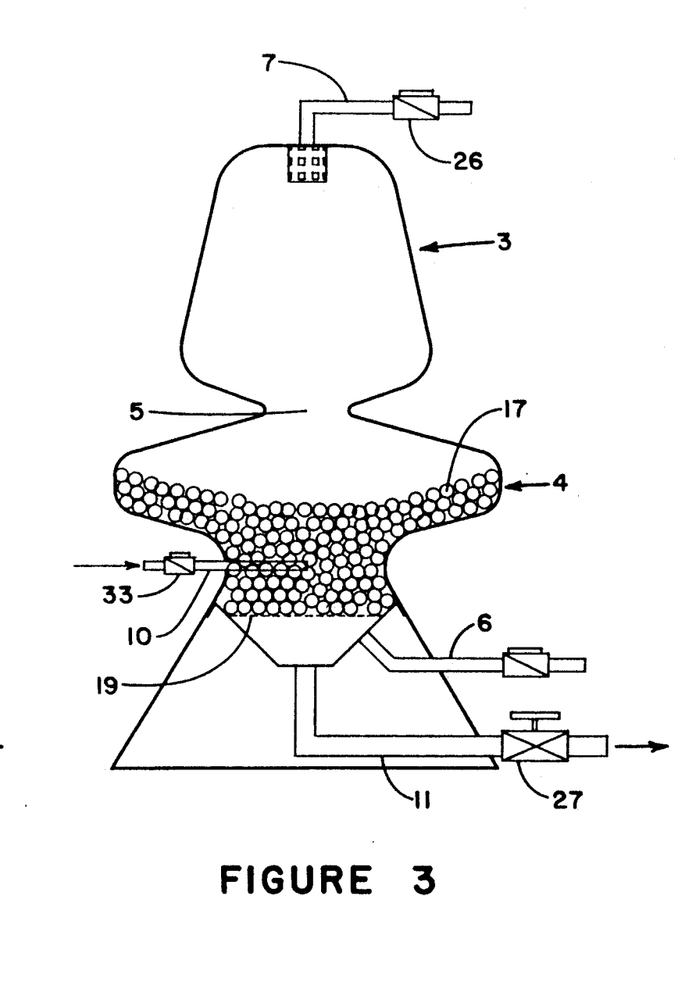
FIG. 3 is a sectional view of an embodiment of the invention during the drainage step of operation.
Figure 4:
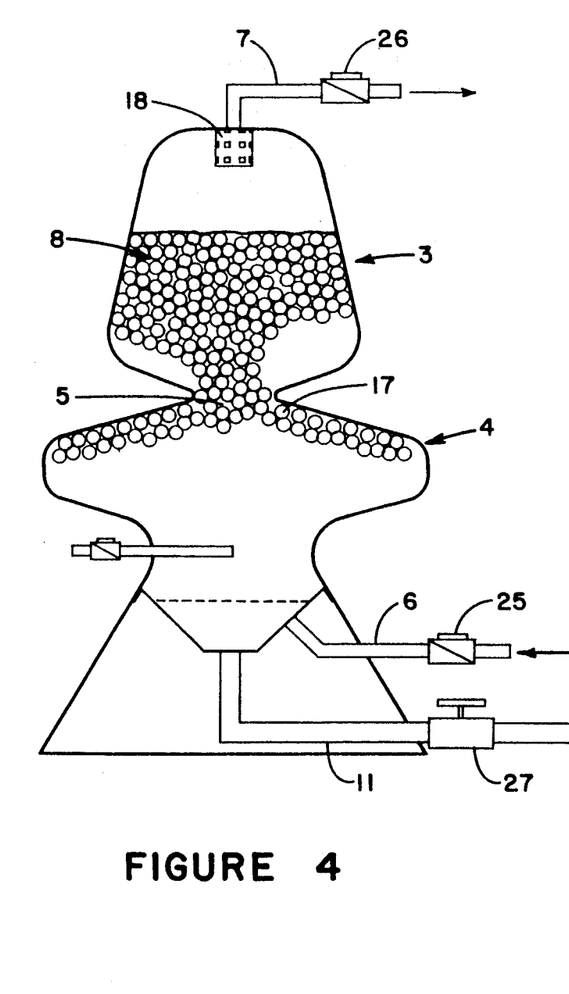
FIG. 4 is a sectional view of an embodiment of the invention during the resumption of filtration step of operation.

As can be seen in FIGS. 2-4, the placement and sizing of air inlet line 10 and sludge line 11 are critical to effective backwashing. Air inlet line 10 is preferably positioned well below and directly beneath washing throat 5 so that rising bubbles 32 maximize the turbulence through the central axis 70 of washing throat 5. The water removal rate during the backwash cycle controls both the degree of turbulence induced by the rising bubbles 32 and the maintenance of the critical downward flux rate through washing throat 5. Failure to achieve complete fluidization of media pack 9 reduces cleaning action and can lead to obstruction of washing throat 5 by clumping of pellets 17. The rate of water removal through sludge line 11 is controlled by the pressure difference between the end 34 of air inlet line 10 and the discharge end (not shown) of sludge line 11, as well as the frictional losses within sludge line 11. Discounting the frictional losses, the relative vertical placement of air inlet line 10 and the discharge end of sludge line 11 is very important. Because air inlet line 10 should be placed in the lower portion 30 of expansion chamber 4 to maximize turbulence, a support base 12 is preferably added which elevates expansion chamber 4 from the discharge end of sludge line 11. This configuration, or any similarly effective arrangement, is advantageous in creating the proper backwash flowrate. Alternatively, a vacuum pressure can be applied to sludge line 11, or a positive pressure can be applied to air inlet line 10, or a flexible sludge line 11 may be used to facilitate the necessary pressure difference.

In operation, the embodiment of the biofilter 1 described above is both simple to use and maintain. During the filtration step of operation shown in FIG. 1, check valve 25 allows contaminated water delivered from a source by inlet pump 24 to flow through inlet line 6 into expansion chamber 4 of tank 2. Sludge valve 27 of sludge line 11 remains closed throughout the filtration cycle. Floating media 8 rise with the level of the water into filtration chamber 3, and are prevented from flowing out of tank 2 through outlet line 7 by upper screen 18. Pellets 17 in media 8 quickly form a media pack 9 at the top of filtration chamber 3, which retains and traps unwanted particles and other matter from the water. Filtered water exits tank 2 through check valve 26 in outlet line 7 and is returned to its source by any effective conduit (not shown). During filtration, no air is drawn through air inlet line 10, and water inside tank 2 is prevented from exiting tank 2 through air inlet line 10 by check valve 33. Over time, a floc 22 will develop in and around media pack 9 which becomes rich in nitrifying bacteria and aids in the filtration of biological contaminants from the source water.

When the media pack 9 becomes undesirably congested after long periods of filtration, the biofilter 1 must be backwashed to remove all accumulated sediment which has fallen into expansion chamber 4, and the media pack 9 must be fluidized to dislodge the floc 22 which has become adhered to pellets 17. Backwashing is accomplished by first disabling pump 24 so that source water is no longer flowing through inlet line 6. Because of the resultant closure of check valve 26 in outlet line 7, no water or air enters tank 2 from outlet line 7. Sludge valve 27 is then opened, and a negative pressure is created in tank 2. Air is then either drawn into expansion chamber 4 from the atmosphere, or less preferably injected from a pressurized air source, through air inlet line 10, and bubbles 32 rise toward washing throat 5 as previously described causing media pack 9 to fall. Bubbles 32 displace the water in tank 2 and media pack 9 becomes turbulently agitated by the simultaneous action of bubbles 32 and the passage through washing throat 5 at a high velocity as shown in FIG. 2. As described earlier, washing throat 5 and sludge line 11 are sized to assure that enough turbulence is created to fluidize media pack 9. The downward expansion of floating media 8 into expansion chamber 4 shears biofloc 22 and captured suspended solids from pellets 17. The water and sludge 23 exiting tank 2 are then delivered to the appropriate disposal location. Once all of the media 8 have passed through washing throat 5, they are prevented from entering sludge line 11 by lower screen 19 as shown in FIG. 3. Sludge valve 27 and air inlet line 10 are then closed, and pump 24 is restarted to allow influent water to enter tank 2 through inlet line 6. As tank 2 becomes filled, floating media 8 rise with the water level and combine to reform a new media pack 9 within filtration chamber 3, thus recommencing the filtration process as depicted in FIG. 4. The frequency of backwashing is determined by several factors, namely: 1) the amount of water loss from the aquaculture environment or other source that may be tolerated, 2) the extent to which it is desired for biofloc 22 and nitrifying bacteria to remain attached to media 8 for the next filtration period, and 3) the desired filtration flowrate through biofilter 1 affected by the amount of solids adhering to media pack 9.

Figure 5:
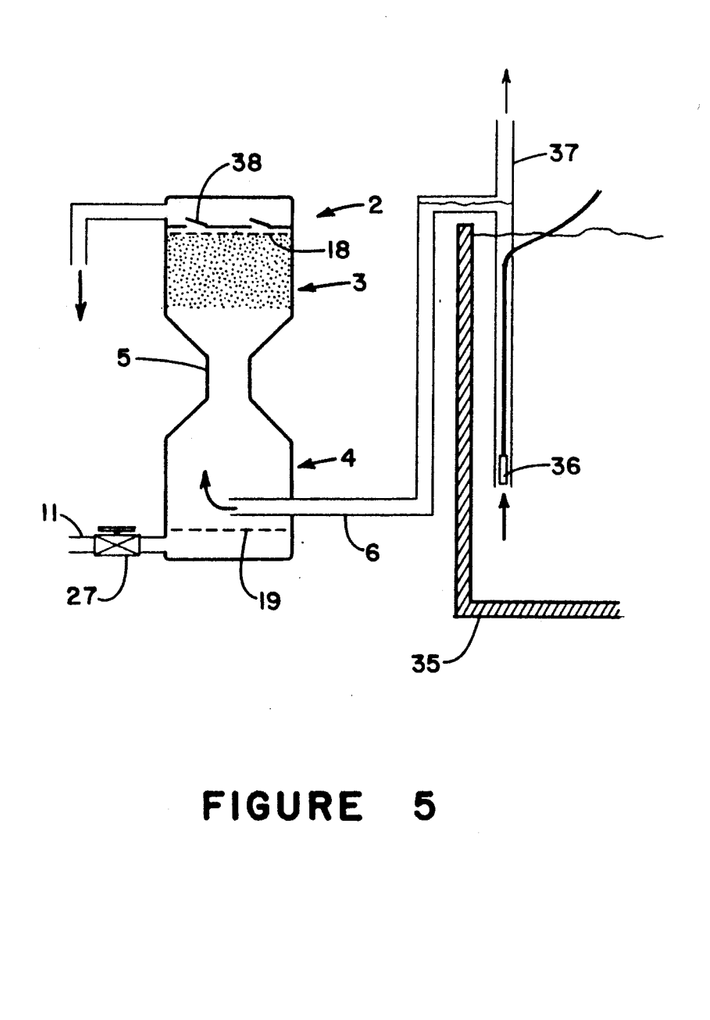
FIG. 5 is a sectional view of a second embodiment of the invention for use with aquaria showing the filtration step of operation.

Another embodiment of the biofilter 1 is shown in FIG. 5, which may be used for aquaria and similar small-scale filtration needs where air lift pumps are employed. Biofilter 1 is located outside aquarium 35 and is supplied with influent water through inlet line 6. Inlet line 6 originates in aquarium 35 and contains an air lift pump 36 which pumps influent water from aquarium 35. Air vent 37 is fluidically connected to air inlet line 6 and is open to atmospheric pressure. Above upper screen 18 is at least one flap valve 38 which prevents filtered water from returning into biofilter 1 during backwashing, similar to check valve 26 in the preferred embodiment described above. The most important difference between this embodiment and the previous embodiment is that inlet line 6 is also used in combination with air vent 37 to perform the same function as air inlet line 10 when the biofilter 1 is backwashed. This configuration makes it preferable to have inlet line 6 enter expansion chamber 4 at a location above lower screen 19 so that the path of the turbulent bubbles 32 is unobstructed.

Figure 6:
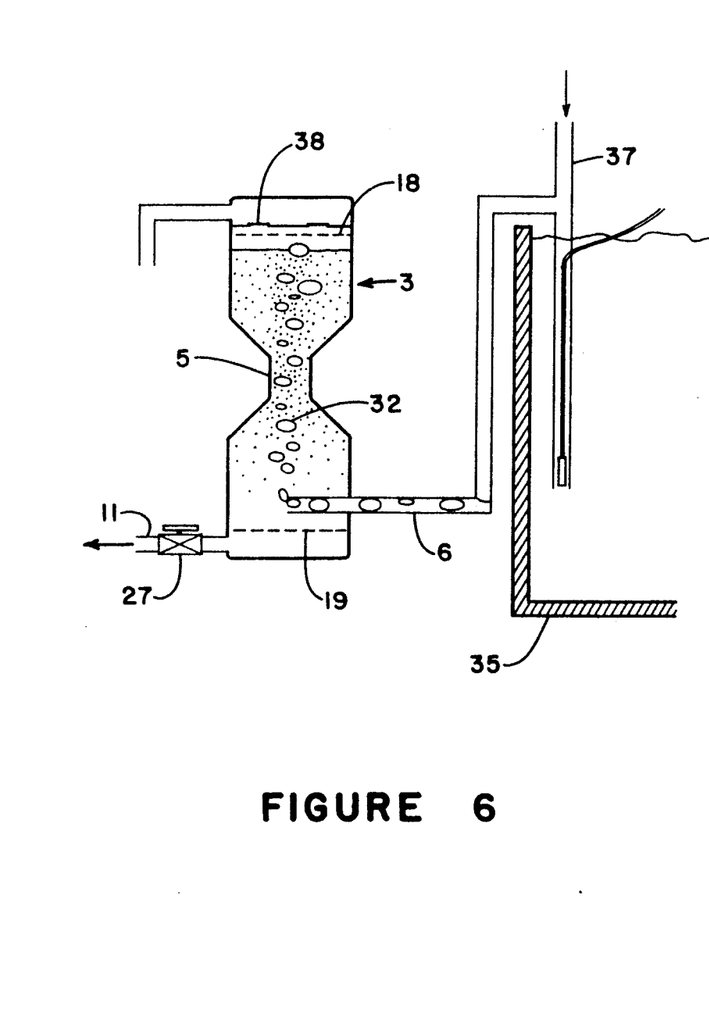
FIG. 6 is a sectional view of a second embodiment of the invention for use with aquaria showing the backwashing step of operation.

In operation of the aquarium biofilter 1, filtration is accomplished identically as described earlier with the exception that air lift pump 36 is used as the motive force for the source water. To backwash the system, however, air lift pump 36 is turned off, and sludge valve 27 is opened. These actions cause atmospheric air above air vent 37 to enter inlet line 6 as shown in FIG. 6, which sends a turbulent stream of bubbles 32 into washing throat 5 to break up the downcoming media 8 and shear the solids and biofloc from pellets 17. Once the water and waste in tank 2 are purged, sludge valve 27 is closed, and air lift pump 36 is restarted. Influent water from aquarium 35 refills tank 2 causing the media pack 9 to reform and filtration to resume as described in the previous embodiment.

Figure 7:
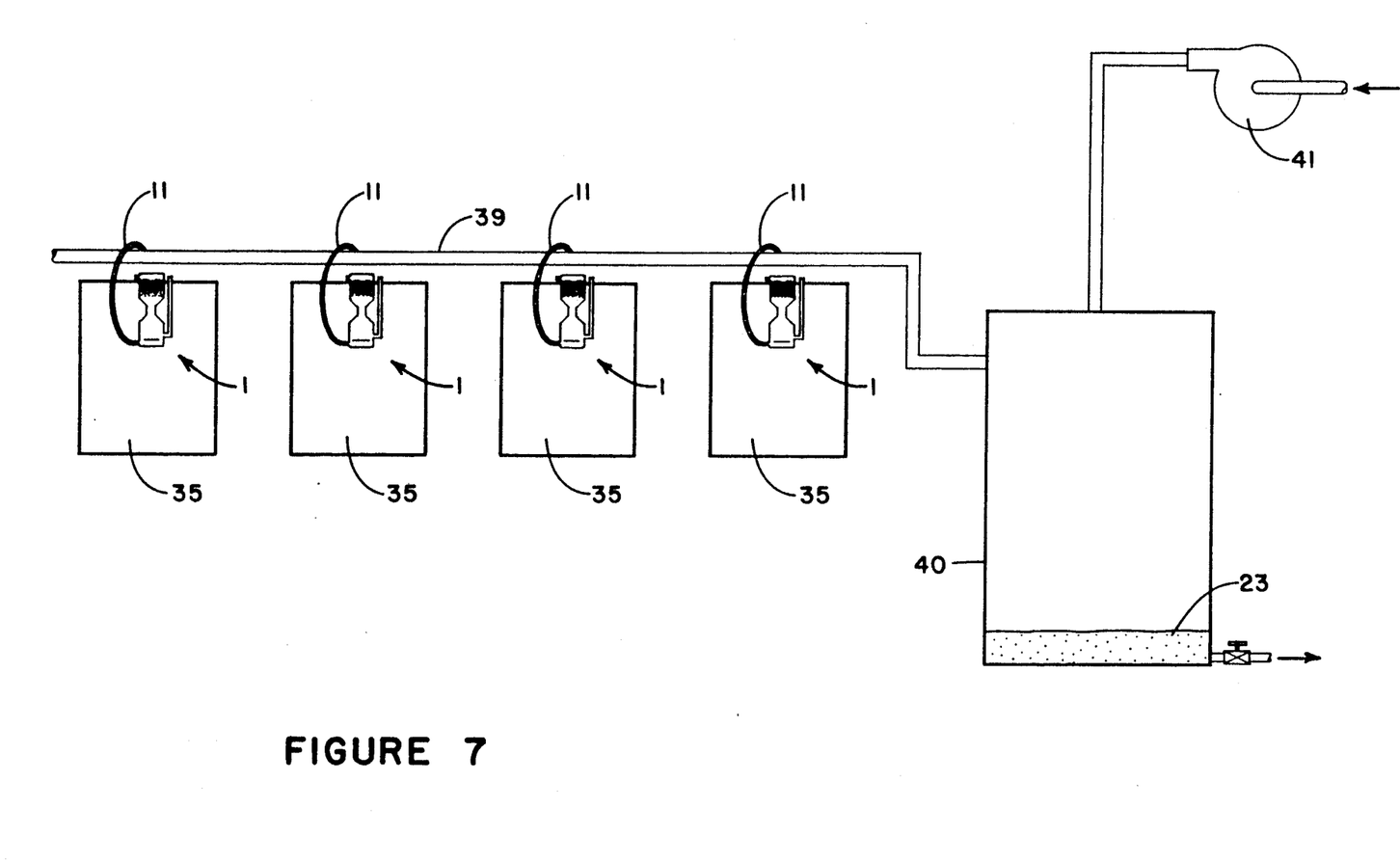
FIG. 7 is a view of a multiple biofilter configuration for use with a sludge tank and vacuum pump.

In environments where many aquaria 35 are used, such as in pet stores, several of the biofilters 1 just described may be linked together for backwashing purposes by connecting sludge lines 11 to a main sludge pipe 39, as shown in FIG. 7. Sludge pipe 39 leads into sludge tank 40, and the aquaria 35 can be cleaned simultaneously by operation of a vacuum pump 41 connected to sludge tank 40. Such centralized cleaning is accomplished without the cross-contamination of waters experienced in alternate methods, eliminating both high labor costs while promoting isolation of diseased aquaria.

Figure 8:
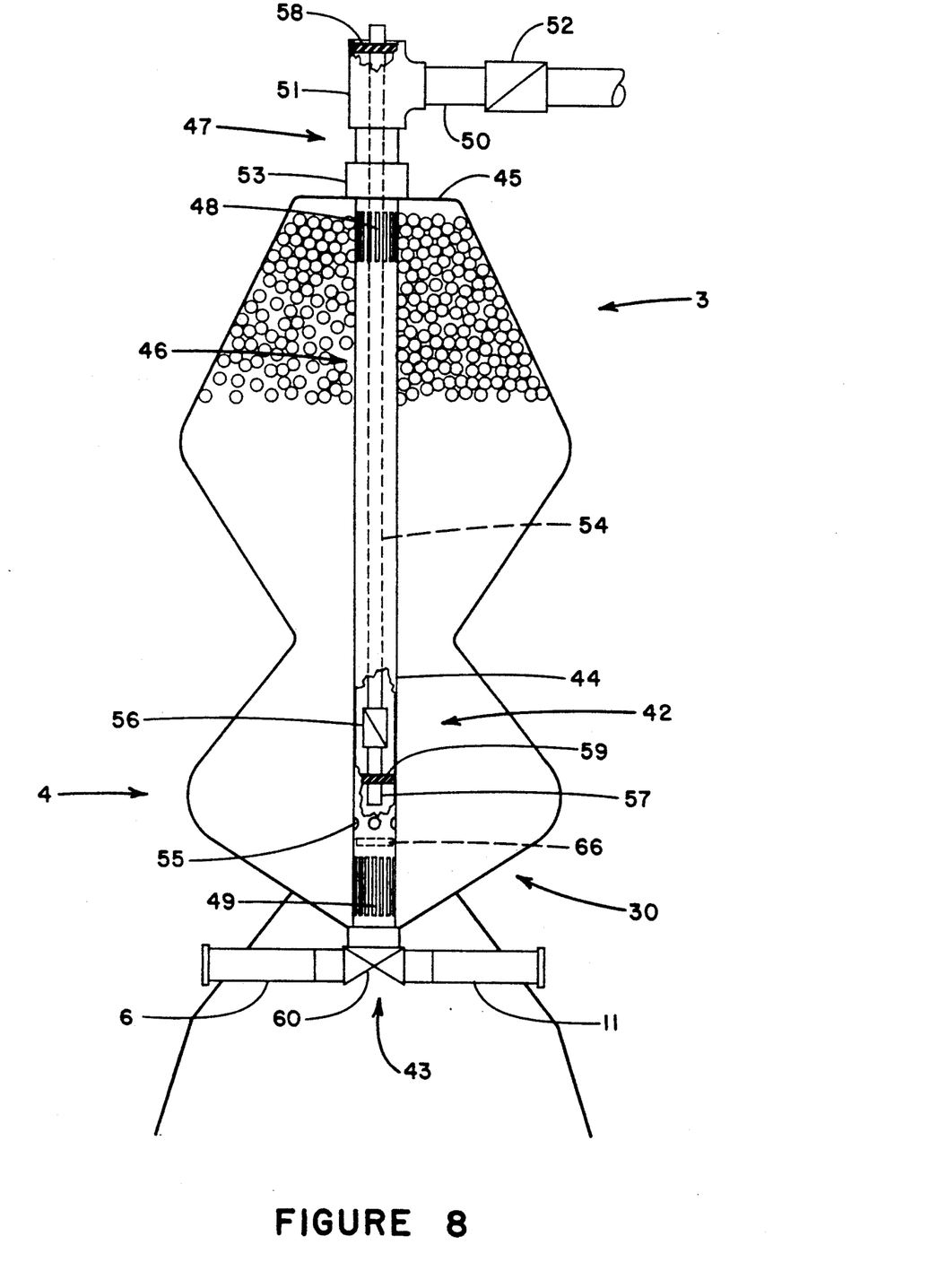
FIG. 8 is a sectional view of a third embodiment of the invention depicting a modular configuration for the inlet line, outlet line, air inlet line, and screens.

A third embodiment of the hourglass biofilter 1 is depicted in FIG. 8, wherein the functional features of upper and lower screens 18,19, outlet line 7, and air inlet line 10 are combined in a removable main assembly 42 for ease of maintenance. Inlet line 6 and sludge line 11 are combined in bottom tee section 43 which is fluidically connected with lower portion 30 of expansion chamber 4 by way of a 3-way valve 60. Main assembly 42 comprises an outlet pipe 44 which is sized to sealingly fit through the top 45 of filtration chamber 3, and which is fluidically connectable to tee section 43. Outlet pipe 44 includes an internal portion 46 and an external portion 47. Internal portion 46 includes a cylindrical-shaped upper screen 48 formed as a part of the material of outlet pipe 44. Internal portion 46 also includes a lower screen 49 identical in structure to upper screen 48. Upper screen 48 and lower screen 49 are located along outlet pipe 44 such that when outlet pipe 44 is connected to tee section 43, lower screen 49 is directly adjacent to tee section 43, and upper screen 48 is directly adjacent to the top 45 of filtration chamber 3. External portion 47 of outlet pipe 44 extends from the top 45 of filtration chamber 3 and has an outlet tee section 51 which is connectable to an outlet conduit 50 leading back to the water source. Outlet check-valve 52 is present within outlet tee section 51 to prevent the return of filtered water into tank 2 during backwashing. A removable airtight seal 53 exists at hole 45 between the outside of outlet pipe 44 and the top 45 of filtration chamber 3.

The intake of air for backwashing purposes is accomplished by an air inlet tube 54 open to atmospheric air, and which is inserted within outlet pipe 44 as shown in FIG. 8. Upper seal 58 is located along air inlet tube 54 at a point above outlet tee section 51, and creates a water-tight seal between air inlet tube 54 and outlet pipe 44 to keep the filtered water flowing through outlet tee section 51 to outlet conduit 50. Similarly, lower seal 59 is located near the opening 57 of air inlet tube 54 which creates a water-tight seal between air inlet tube 54 and outlet pipe 44 to prevent contaminated water delivered by inlet pipe 6 from bypassing media pack 9 by flowing directly to outlet tee section 51 through outlet pipe 44. One or more holes 55 are formed in outlet pipe 44 below lower seal 59 and above lower screen 49 so that air bubbles from opening 57 of air inlet tube 54 are allowed to rise into washing throat 5. Preferably, plug 66 is also located within outlet pipe 44 between holes 55 and lower screen 49 to force bubbles 32 to exit only through holes 55. To prevent the backflow of water into air inlet tube 54, check valve 56 is included in air inlet tube 54 near opening 57.

Operation of the third embodiment is very similar to those previously described. The 3-way valve 60 is positioned to allow influent water to be received through inlet line 6 and bottom tee section 43, and influent water flows into expansion chamber 4 through lower screen 49 of outlet pipe 44. Influent water is prevented from traveling any further through main filter assembly 42 by lower seal 59 and check valve 56. After passing through the filter media pack 9, filtered water exits filtration chamber 3 through upper screen 48 and continues through outlet tee section 51 back to the source. Backwashing is achieved simply by positioning the 3-way valve 60 so that flow is established only between tank 2 and sludge line 11, thereby causing air to be drawn through air inlet line 10 from the atmosphere, and media pack 9 to fall and become fluidized as in the other embodiments.

Figure 9:
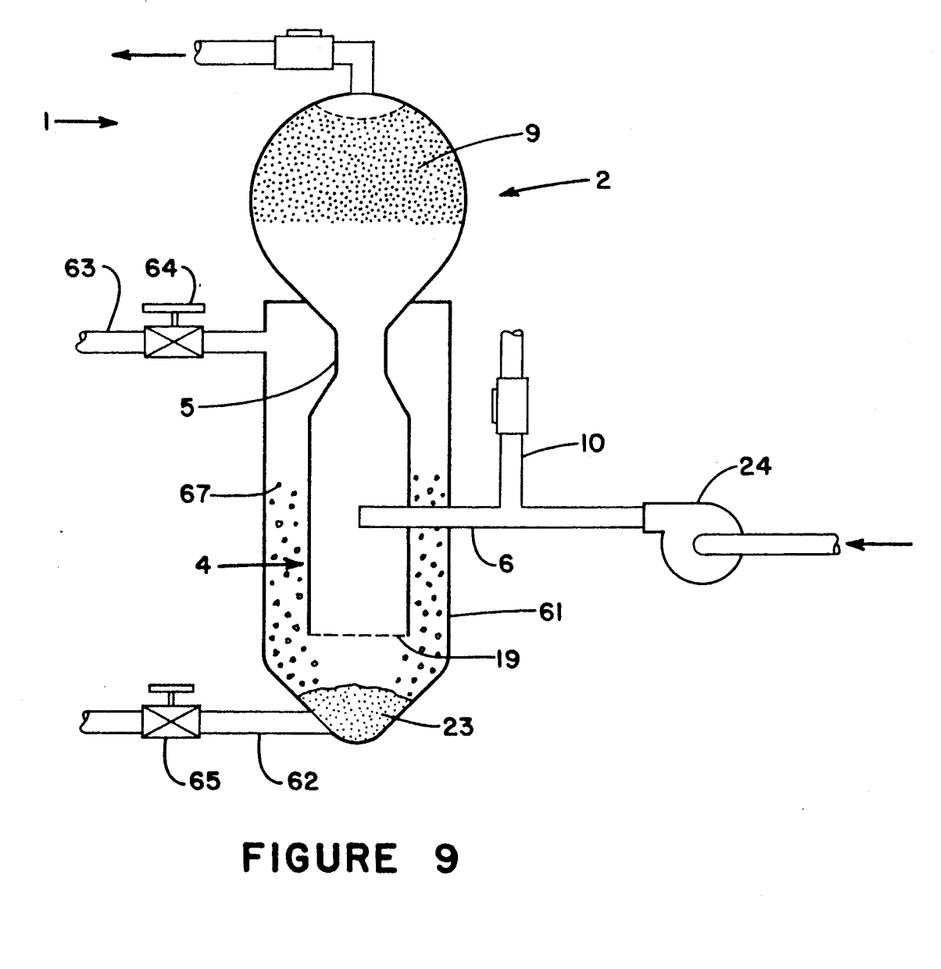
FIG. 9 is a sectional view of a fourth embodiment of the invention which is designed to minimize waste water loss.

A fourth embodiment of the present biofilter 1 invention is also shown in FIG. 9 which minimizes the water loss associated with backwashing. Tank 2 is generally similar to the tank shown in FIGS. 1-8. However, sludge 23 which falls through lower screen 19 is allowed to settle at the bottom of a settling tank 61. Settling tank 61 is a closed vessel and surrounds expansion chamber 4 of tank 2 and includes a sludge line 62 and sludge valve 65 similar in function to sludge line 11 and sludge valve 27 seen in the other embodiments. Settling tank 61 also includes a backwash line 63 located at a height just above washing throat 5 which leads back to the water source. Backwash valve 64 regulates whether water in settling tank 61 is delivered back to the water source.

Operation of the filtering phase of this embodiment involves receiving source water through inlet line 6 and passing it through the media pack 9 as described earlier. However, heavier solids are allowed to fall through lower screen 19 and collect at the bottom of settling tank 61. During filtration, both backwash valve 65 and sludge valve 64 are closed. To begin a backwash cycle, sludge valve 65 is opened while the biofilter 1 is still under positive pressure during filtration, but only for a period long enough to discharge most of the accumulated sludge 23 in settling tank 61. This release of sludge 23, therefore, results in minimal water loss. Inlet pump 24 is then shut off, and backwash valve 64 is opened. Air is then drawn into tank 2 by air inlet line 10 to cause media pack 9 to fall and break up by the passage of media 8 through washing throat 5. The height of backwash line 63 on settling tank 61 allows the backwash water to re-enter the water source, but prevents most of the suspended solids 67 from being returned, because they become trapped and fall to the bottom of settling tank 61 near sludge line 62. Thus, the desired amount of biofloc on the media 8 can be more easily retained through careful regulation of backwash frequency without the associated water losses inherent in other systems.

Although the present invention has been described in terms of specific embodiments, it is anticipated that alterations and modifications thereof will no doubt become apparent to those skilled in the art. For example, it will be understood that any pre-filtering of large solids from the influent water prior to entering the biofilter would improve filtration efficiency and reduce the frequency of backwash operations. Also, automation of the backwashing process through any appropriate control system could be applied to any of the embodiments previously discussed. It is therefore intended that the following claims be interpreted as covering all such alterations and modifications which fall within the true spirit and scope of the invention.

I claim:
1. A biofilter, comprising:
   (a) a tank having a filtration chamber and an expansion chamber, wherein said filtration chamber is above and fluidically connected with said expansion chamber;
   (b) floating media means in said tank for forming a floating media pack, having a top portion, in said filtration chamber when said tank is filled with liquid and said media means are undisturbed;
   (c) an upper screen having openings adapted to prevent said media means from passing therethrough, positioned in said tank near said top portion of said floating media pack;
   (d) an inlet line fluidically connected to said tank below said filtration chamber;
   (e) a sludge line having an output end, fluidically connected to said tank;
   (f) a sludge valve, positioned in said sludge line;
   (g) an outlet line fluidically connected to said tank above said upper screen;
   (h) a lower screen having openings adapted to prevent said media means from passing therethrough, positioned in said tank below said floating media means and above said sludge line;
   (i) air inlet means fluidically connected to said tank for drawing air into said expansion chamber and disturbing said floating media pack inside said filtration chamber during backwashing of said biofilter; and
   (j) a constricting means for allowing convergence of said floating media means into said expansion chamber during backwashing of said biofilter, said constricting means having a central vertical axis and separating said filtration chamber from said expansion chamber.
2. A biofilter according to claim 1, wherein said tank forms an hour-glass shape.
3. A biofilter according to claim 1, wherein said lower screen is below said expansion chamber.
4. A biofilter according to claim 1, wherein said floating media means includes a plurality of low density granular media pellets.
5. A biofilter according to claim 1, wherein said air is drawn into said tank from atmospheric pressure by a pressure differential existing between said air inlet means and said output end of said sludge line.
6. A biofilter according to claim 1, wherein said air inlet means includes an air inlet pipe having an outlet positioned to direct said air through said central axis of said constricting means.
7. A biofilter according to claim 1, wherein said filtration chamber includes an upper portion and a lower portion, said upper portion having downwardly diverging sides.
8. A biofilter according to claim 7, wherein said lower portion has downwardly converging sides.
9. A biofilter according to claim 1, wherein said expansion chamber includes an upper portion and a lower portion, said upper portion having upwardly converging sides.
10. A biofilter according to claim 9, wherein said lower portion has downwardly converging sides.
11. A biofilter, comprising:
   (a) a filter tank having a filtration chamber and an expansion chamber, wherein said filtration chamber is above and fluidically connected with said expansion chamber;
   (b) floating media means in said filter tank for forming a floating media pack, having a top portion, in said filtration chamber when said filter tank is filled with liquid and said media means are undisturbed;
   (c) an upper screen having openings adapted to prevent said media means from passing therethrough, positioned in said filter tank near said top portion of said floating media pack;
   (d) a settling tank surrounding said expansion chamber of said filter tank;
   (e) an inlet line fluidically connected to said filter tank below said filtration chamber;
   (f) a sludge line having an output end, fluidically connected to said settling tank;
   (g) a sludge valve, positioned in said sludge line;
   (h) an outlet line fluidically connected to said filter tank above said upper screen;
   (i) a lower screen having openings adapted to prevent said media means from passing therethrough, positioned in said filter tank below said floating media means and above said sludge line;
   (j) a backwash line fluidically connected to said settling tank above said expansion chamber of said filter tank;
   (k) air inlet means fluidically connected to said filter tank for drawing air into said expansion chamber and disturbing said floating media pack inside said filtration chamber during backwashing of said biofilter; and (1) a constricting means for allowing convergence of said floating media means into said expansion chamber during backwashing of said biofilter, said constricting means having a central vertical axis and separating said filtration chamber from said expansion chamber.

12. A biofilter according to claim 11, wherein said filter tank forms an hour-glass shape.

13. A biofilter according to claim 11, wherein said lower screen is below said expansion chamber.

14. A biofilter according to claim 11, wherein said floating media means includes a plurality of low density granular media pellets.

15. A biofilter according to claim 11, wherein said air is drawn into said filter tank from atmospheric pressure by a pressure differential existing between said air inlet means and said output end of said sludge line.

16. A biofilter according to claim 11, wherein said air inlet means includes an air inlet pipe having an outlet positioned to direct said air through said said central axis of said constricting means.

17. A biofilter according to claim 11, wherein said filtration chamber includes an upper portion and a lower portion, said upper portion having downwardly diverging sides.

18. A biofilter according to claim 17, wherein said lower portion has downwardly converging sides.

19. A biofilter according to claim 11, wherein said expansion chamber includes an upper portion and a lower portion, said upper portion having upwardly converging sides.

20. A biofilter according to claim 19, wherein said lower portion has downwardly converging sides.

* * * * *